United States Patent
Van Der Westhuizen

(10) Patent No.: US 10,426,293 B2
(45) Date of Patent: Oct. 1, 2019

(54) COLLAPSIBLE BARBEQUE

(71) Applicant: Konrad Van Der Westhuizen, Brackenfell (ZA)

(72) Inventor: Konrad Van Der Westhuizen, Brackenfell (ZA)

( * ) Notice: Subject to any disclaimer, the term of this patent is extended or adjusted under 35 U.S.C. 154(b) by 542 days.

(21) Appl. No.: 15/114,884

(22) PCT Filed: Jan. 28, 2015

(86) PCT No.: PCT/IB2015/050638
§ 371 (c)(1),
(2) Date: Jul. 28, 2016

(87) PCT Pub. No.: WO2015/114529
PCT Pub. Date: Aug. 6, 2015

(65) Prior Publication Data
US 2016/0338534 A1 Nov. 24, 2016

(30) Foreign Application Priority Data
Jan. 30, 2014 (ZA) .................. 2014/00713

(51) Int. Cl.
*A47J 37/07* (2006.01)

(52) U.S. Cl.
CPC .......... *A47J 37/0704* (2013.01); *A47J 37/07* (2013.01); *A47J 2037/0777* (2013.01)

(58) Field of Classification Search
CPC ............... A47J 2037/0777; A47J 37/07; A47J 37/0704; A47J 37/0763

(Continued)

(56) References Cited

U.S. PATENT DOCUMENTS 4,896,650 A * 1/1990 Hait .................... A47J 37/0763
126/152 B
4,958,618 A * 9/1990 Davidson ............. A47J 36/022
126/25 R (Continued)

FOREIGN PATENT DOCUMENTS

DE    102005031817    1/2007

OTHER PUBLICATIONS

Mosser R., WIPO International Search report for PCT/IB2015/050638, dated Apr. 29, 2015, Vienna.

(Continued)

*Primary Examiner* — Reginald Alexander
(74) *Attorney, Agent, or Firm* — Trego, Hines & Ladenheim, PLLC; Brandon Trego; Jonathan Hines

(57) ABSTRACT

The invention provides a collapsible barbeque (10) comprising a frame (12) which carries a trough (14) and a number of leg assemblies (16) hingedly attached to the frame (12) which support the frame (12) above a surface, such as the ground. The trough (14) includes a rigid floor (20) to provide a heat support surface and collapsible sidewalls (22) which connect the floor (20) to the frame (12). The barbeque (10) is movable from an open, operative configuration in which the collapsible sidewalls (22) are extended and the leg assemblies (16) are hinged outwardly from the frame (12) to a closed, portable configuration in which the collapsible sidewalls (22) are collapsed and the leg assemblies (16) are folded flat against the frame (12). In one embodiment of the invention, the barbeque (10) includes support panels to support cooking utensils thereon.

11 Claims, 4 Drawing Sheets

(58) Field of Classification Search
USPC .................. 99/449, 450; 126/25 R, 9 R, 9 B
See application file for complete search history.

(56) References Cited

U.S. PATENT DOCUMENTS

| | | | | |
|---|---|---|---|---|
| 6,302,097 | B1* | 10/2001 | Rivera | A47J 37/0763 |
| | | | | 126/305 |
| 7,051,649 | B2* | 5/2006 | Lin | A47J 37/0704 |
| | | | | 126/9 B |
| 2014/0007860 | A1* | 1/2014 | Lu | F24C 1/16 |
| | | | | 126/19 M |

OTHER PUBLICATIONS

Cecile Chatel, PCT International Preliminary Report on Patentability for PCT/IB2015/050638, dated Aug. 2, 2016, Switzerland.

* cited by examiner

COLLAPSIBLE BARBEQUE

CROSS-REFERENCE(S) TO RELATED APPLICATIONS

This application claims priority to South African complete patent application number 2014/00713 filed on 30 Jan. 2014, which is incorporated by reference herein.

FIELD OF THE INVENTION

This invention relates to portable barbeques and, more particularly, it relates to barbeques adapted to be collapsed from an open, operative configuration to a closed, portable configuration.

BACKGROUND TO THE INVENTION

Commercially available barbeques are generally designed for outdoor use, typically in back yards or on patios or decks. The barbeques are generally made from heavy sheet steel or cast aluminium so as to withstand years of outdoor storage and use. Furthermore, commercial barbeques are commonly large, heavy and bulky and therefore either fixed in a specific location or include wheels so as to allow them to be moved over short distances.

In order to provide barbeques for camping and outdoor enthusiasts, who generally require barbeques which are easy to transport, use and clean and which do not require excess space during transportation thereof, a variety of portable barbeques have been developed. Such portable barbeques are generally lighter and smaller than the commercial barbeques described above, however, these generally need to be disassembled prior to being transported by means of a car or van. Furthermore, the dissembling of these portable barbeques has the inherent risk of certain of the parts being damaged or lost and the disassembling thereof generally takes quite some time.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a collapsible barbeque comprising a frame which carries a trough and a number of leg assemblies which support the frame above a surface, wherein the trough includes a rigid floor to provide a heat support surface and collapsible sidewalls which connect the floor to the frame, and wherein the leg assemblies are hingedly attached to the frame, the collapsible barbeque being movable from an open, operative configuration in which the collapsible sidewalls are extended and the leg assemblies are hinged outwardly from the frame to a closed, portable configuration in which the collapsible sidewalls are collapsed and the leg assemblies are folded flat against the frame.

In a preferred embodiment the frame and trough are generally rectangular in shape with the trough having two sidewalls hingedly attached to the frame and the sidewalls include at least one hinge up the height thereof so that they can collapse inwardly in concertina fashion with the floor moving towards the frame and the sidewalls folding inwardly toward each other. In an alternative embodiment each sidewall has two or more hinges up the height thereof which split the sidewalls into three or more sections.

Further features provide for the barbeque to include two leg assemblies hingedly attached on opposing ends of the frame; and for each leg assembly to provide an end wall for the trough such that when the barbeque is in the open, operative configuration the trough comprises a generally rectangular container having an open top.

In a preferred embodiment the leg assemblies and sidewalls are hingeldy attached to inner surfaces of the frame, with the leg assemblies being enabled to hinge into the interior of the frame so that the trough and leg assemblies fold into the interior of the frame when the barbeque is in the closed, portable configuration.

Further features provide for the barbeque to include support panels; for the support panels to be hingedly attached to outer surfaces of the frame; and for the support panels to be enabled to fold outwardly from the frame.

Yet further features provide for the collapsible barbeque to include a cooking grid which is configured to be supported on the frame when the collapsible barbeque is in the open, operative configuration; for the cooking grid to be shaped and sized to cover substantially the entire surface of the frame when supported thereon; and for the collapsible barbeque to include a spacer that is configured to be supported on the frame with the cooking grid supported by the spacer so as to enable varying the space between the cooking grid and the frame.

Still further features provide for the barbeque to include a number of elongate reinforcing members each of which is hingedly attached to a leg assembly and the frame; for each elongate reinforcing member to include a hinge midway along its length which splits the reinforcing member into two elements so as to permit the reinforcing members to fold about the hinge when the barbeque is moved between the open, operative configuration to the closed, portable configuration; and for the reinforcing members to include a detent adjacent the hinge so that the reinforcing member can fold in one direction only.

Further features of the invention provide for the barbeque to be made from any suitable fire-resistant material, preferably aluminium, stainless steel, or the like.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Figure 1:
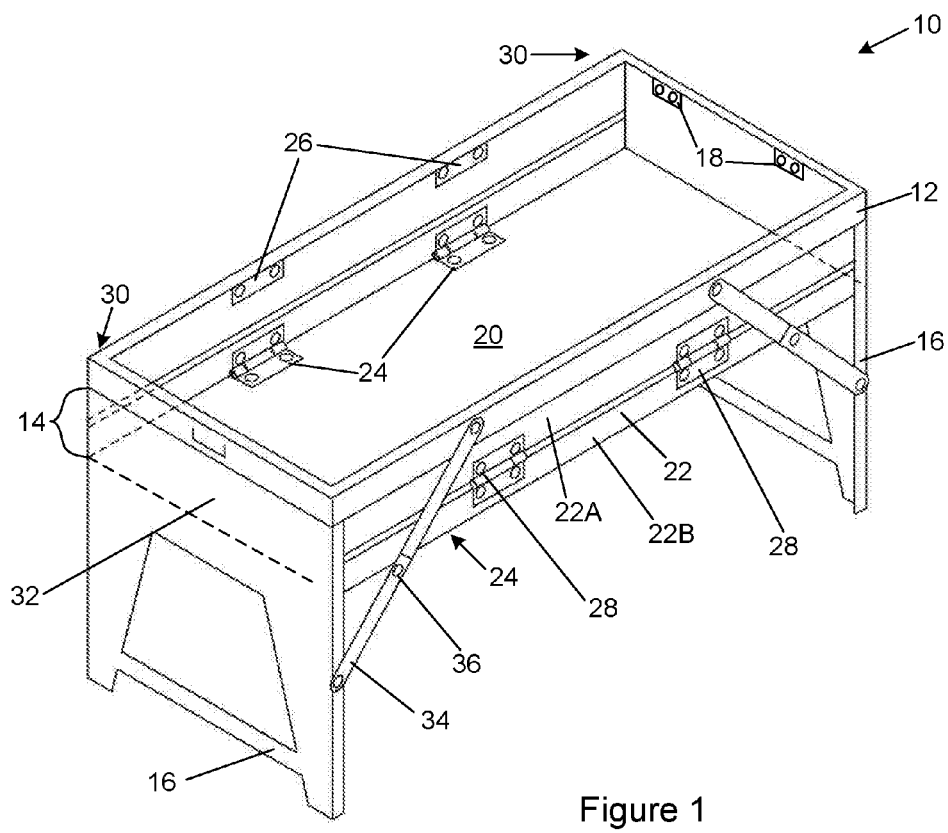
FIG. 1 illustrates one embodiment of a collapsible barbeque with the barbeque in an open, operative configuration.

A first embodiment of a collapsible barbeque (10) in an open, operative configuration is shown in FIG. 1. The barbeque (10) comprises a frame (12) which carries a trough (14) and a number of leg assemblies (16) that are attached to the frame (12) by means of hinges (18) and which support the frame (12) above a surface such as the ground. The trough (14) includes a rigid floor (20) to provide a heat support surface, and collapsible sidewalls (22) which connect the floor (20) to the frame (12). In this embodiment the floor (20) is attached to the sidewalls (22) by means of hinges (24).

The frame (12) and trough (14) are preferably rectangular in shape with the trough (14) having two sidewalls (22) that are attached by means of hinges (26) to inner surfaces (not shown) of the frame (12). The sidewalls (22) include hinges (28) up the height thereof, thereby splitting each sidewall (22) into two separate sections (22A, 22B) that are attached to each other by means of the hinges (28). In this embodiment two hinges (28) are provided. The hinges (28) splitting the sidewalls (22) into the two sections (22A, 22B) allows the sidewalls (22) to collapse as will be described in more detail further below. It will be appreciated that instead of having two separate hinges (28) as illustrated in this embodiment, the sidewalls (22) may also include a single hinge (28) which spans the length of a sidewall (22). Furthermore, each sidewall (22) may also be provided with a number of hinges up the height thereof which then split the sidewalls (22) into numerous sections.

In this embodiment, the collapsible barbeque (10) has two leg assemblies (16) that are attached to opposing ends (30) of the frame (12) by means of hinges (18) so as to enable the leg assemblies (16) to be folded against the frame (12). When the barbeque (10) is in the open, operative configuration and as illustrated in FIG. 1, the leg assemblies (16) provide two end walls (32) of the trough (14) so that the trough (14) comprises a generally rectangular container having a rigid bottom (20), with two sidewalls (22), two end walls (32) and an open top.

Figure 3:
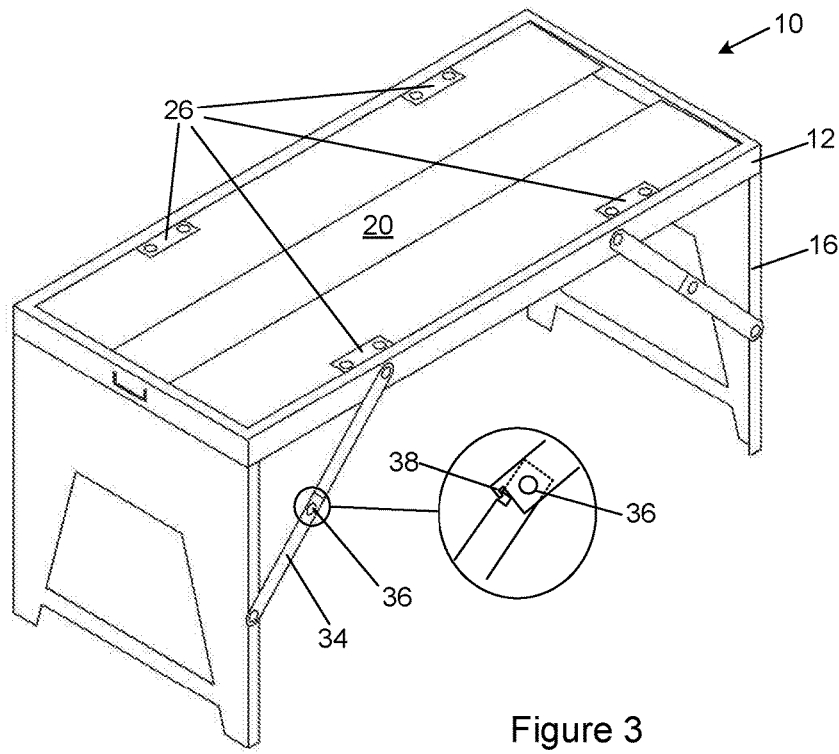
FIG. 3 illustrates the collapsible barbeque of FIGS. 1 and 2 with both leg assemblies hinged outwardly from the frame and the sidewalls of the trough fully collapsed.

Furthermore, the collapsible barbeque (10) includes four reinforcing members (34) each of which is hingedly attached to a leg assembly (16) and the frame (12). The reinforcing members (34) comprise elongate flat elements that have a hinge (36) midway along their length so as to permit the members (34) to fold. A detent (38) is preferably provided adjacent the hinge (36) which ensures that the members (34) can fold in one direction only and not beyond the position where the member (34) is extended, as best illustrated in FIG. 3. When the collapsible barbeque (10) is in the open, operative configuration, the reinforcing members (34) are expanded with the detent (38) preventing further folding of the members (34), thereby preventing the leg assemblies (16) from being fold against the frame (12). In order to collapse the barbeque (10) and fold the leg assemblies (16) flat against the frame (12), the detent (38) must be released, typically through the exertion of a slight force on the member (34) approximately midway along its length, which releases the detent (38) and permits the reinforcing member (34) to fold about the hinge (36). It will be appreciated that the reinforcing members (34) will prevent, or at least minimize, accidental folding of the leg assemblies and thus accidental collapsing of the barbeque while in use.

Figure 4:
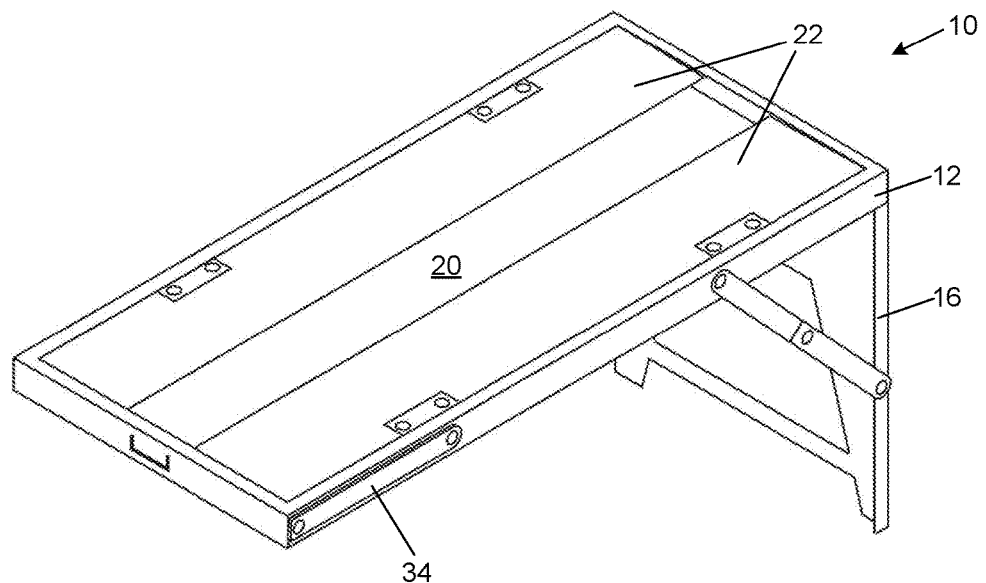
FIG. 4 illustrates the collapsible barbeque of FIG. 3 with one leg assembly hinged outwardly from the frame and one leg assembly folded flat against the frame.
Figure 5:
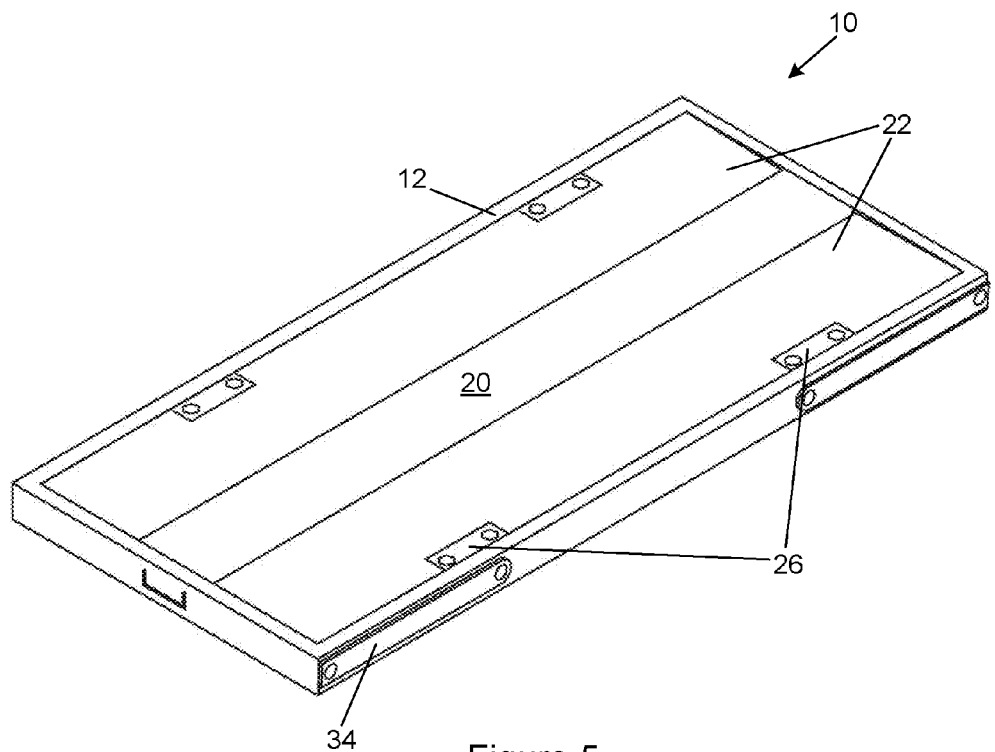
FIG. 5 illustrates the collapsible barbeque of FIG. 1 in a closed, portable configuration.

FIGS. 1 to 5 illustrate collapsing of the barbeque (10) from an open, operative configuration in FIG. 1, in which the collapsible sidewalls (22) are extended and the leg assemblies (16) are hinged outwardly from the frame (12) to a closed, portable configuration in FIG. 5, where the sidewalls (22) are collapsed and the leg assemblies (16) are folded flat against the frame (12).

Figure 2:
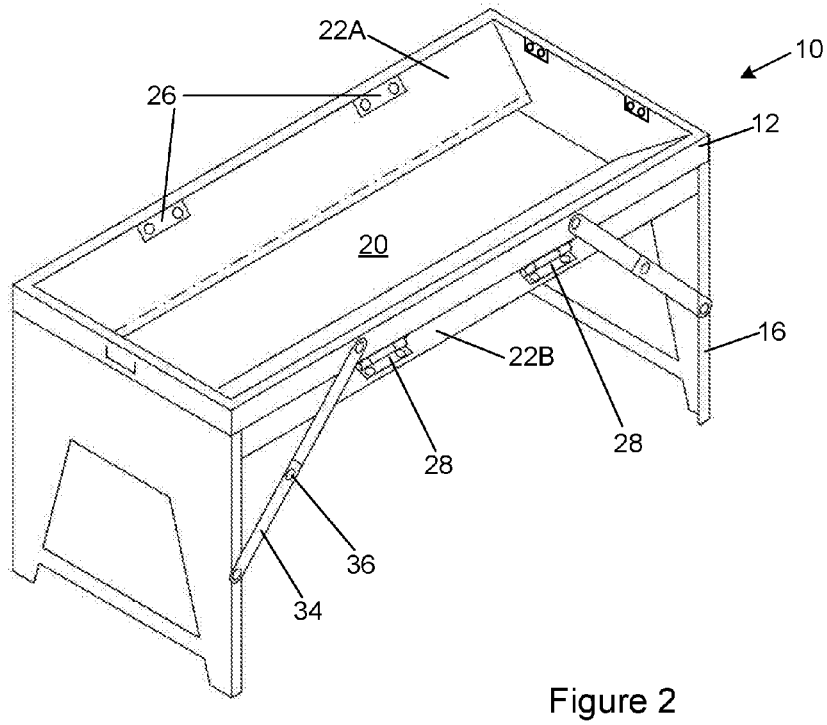
FIG. 2 illustrates the collapsible barbeque of FIG. 1 where the barbeque is partially collapsed with the sidewalls of the trough in an intermediate collapsed position.

As is illustrated in FIG. 2, in order to collapse the barbeque (10) from the open, operative condition, the bottom (20) of the trough (14) is moved toward the frame (12) thereby causing the sidewalls (22) to collapse inwardly in concertina fashion with the two sidewalls (22) folding toward each other. Due to the sidewalls (22) of the trough (14) being attached to inner surface of the frame (12), when the sidewalls (22) are fully collapsed the entire trough (14) folds into the interior of the frame (12) as is illustrated in FIG. 3.

Once the trough (14) has been folded into the interior of the frame (12), the leg assemblies (16) are folded flat against the frame (12) about the hinges (18), as is illustrated in FIG. 4. The leg assemblies (16) are also attached to inner surfaces of the frame (12) and are therefore also folded into the interior of the frame (12).

Figure 6:
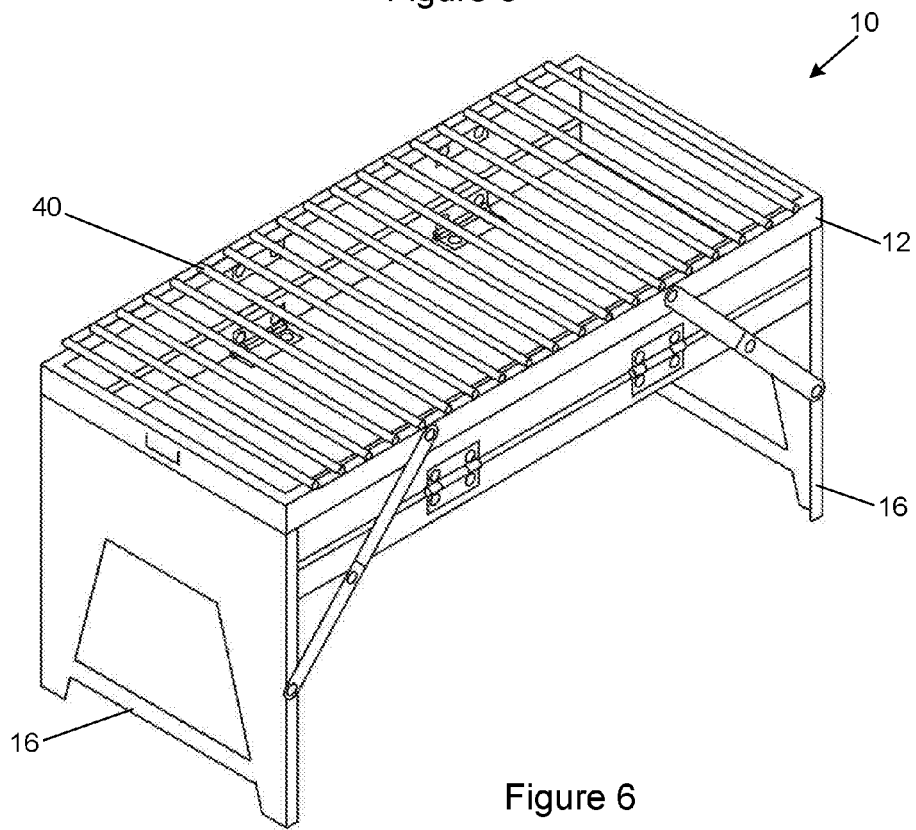
FIG. 6 illustrates the collapsible barbeque of FIG. 1 in which the frame supports a cooking grid.
Figure 7:
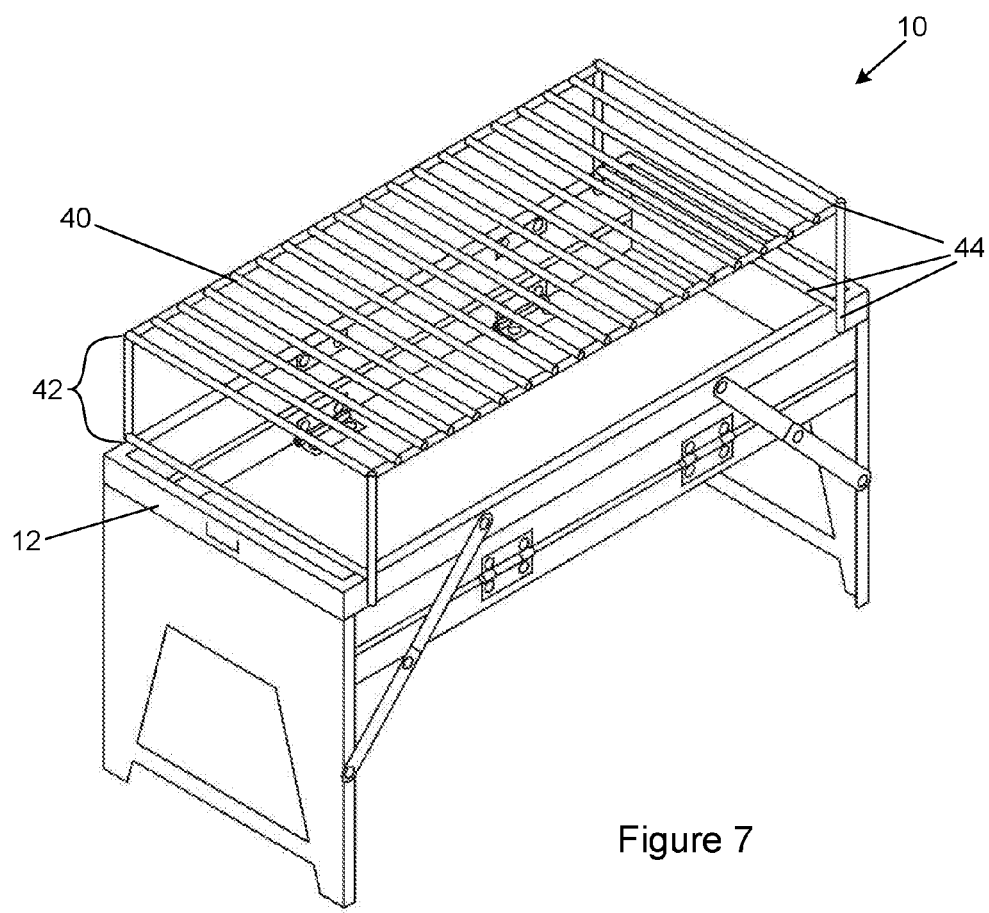
FIG. 7 illustrates the collapsible barbeque of FIG. 6 in which a spacer is supported on the frame with the cooking grid supported on the spacer.

In use and in order to cook food, the collapsible barbeque (10) is opened to its open, operative configuration and a fire is made on the floor (20) of the trough (14) typically utilizing wood, charcoal or the like. Once the fire has reached a suitable cooking temperature, a cooking grid (40) is placed onto the frame (12), as best illustrated in FIG. 6. The cooking grid (40) will enable a user to cook foodstuffs on the barbeque (10). Nevertheless, since it may be desirable to adjust or change the intensity of heat which the foodstuff on the cooking grid (40) is exposed to, a spacer (42) comprising a number of rods (44) attached to each other to form a box like structure. The spacer (42) may be supported on the frame (12) with the cooking grid (40) in turn being supported on the spacer, as best illustrated in FIG. 7. It will be appreciated that the spacer may comprises a number of rods on which the cooking grid can be supported so as to provide a number of different heights at which the cooking grid can be supported above the frame. In addition, the individual sides of the box like structure of the spacer may be hingedly attached to each other so as to enable the spacer to fold into a generally flat structure.

It will be appreciated that once the barbeque (10) has been fully collapsed, as illustrated in FIG. 5, it can easily be carried and/or transported by a user thereof. Furthermore, due to the entire barbeque (10) folding into the generally flat rectangular frame (12), it does not require a lot of space during transportation. In addition, in order to be both durable as well as light, it is preferred that the barbeque (10) is made from aluminium or stainless steel, however, any other suitable material may be used.

It will further be appreciated that many other embodiments of a collapsible barbeque exist which fall within the scope of the invention, particularly regarding the shape and configuration thereof. For example, the collapsible sidewalls could be made from a chain link material which will enable the sidewalls to collapse so that the trough may fold into the interior of the frame. Also, the barbeque could be any shape such as round, oval or square.

It will also be appreciated that although it is preferable that the barbeque is generally sized to enable easy transportation thereof, it may be of any desirable size. The trough could also have two open sides, in which case the leg assemblies do not have to provide sidewalls and could simply be legs located at or near each corner of the frame and which may fold into the interior of the frame. It is also not necessary that the trough and leg assemblies collapse into the interior of the frame.

Figure 8:
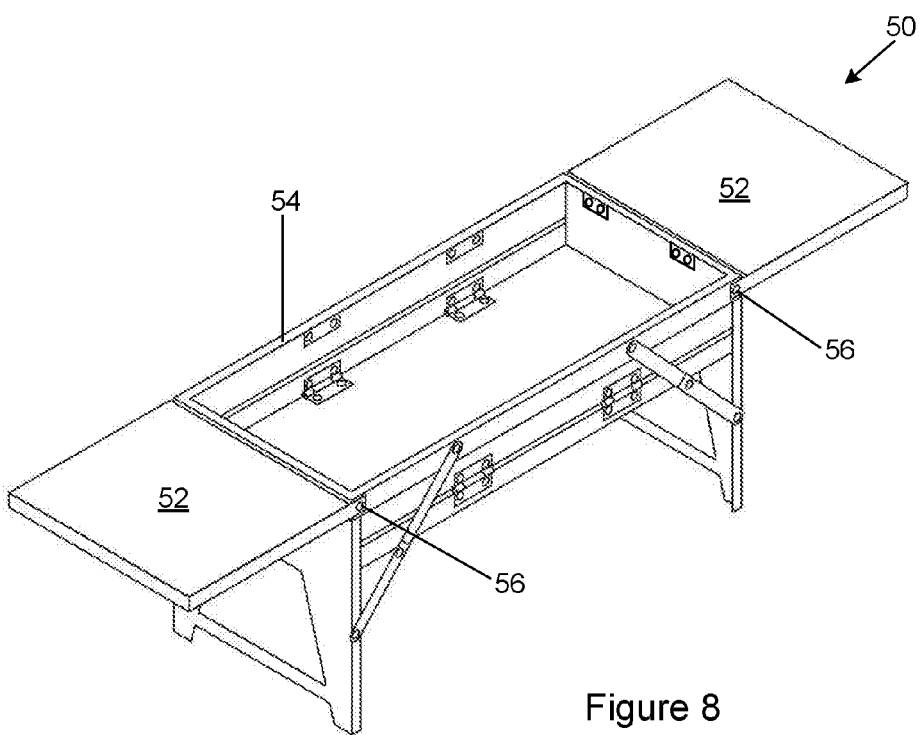
FIG. 8 illustrates an alternative embodiment of a collapsible barbeque in which the barbeque has two support panels attached on opposing ends of the frame.

FIG. 8 illustrates an alternative embodiment of a collapsible barbeque (50) in accordance with the invention. The collapsible barbeque (50) of this embodiment is similar to the collapsible barbeque (10) illustrated in FIGS. 1 to 5, provided that in this embodiment the barbeque (50) is provided with support panels (52) that are attached to the frame (54) by means of hinges (56). The support panels (54) are preferably attached to outer surfaces of the frame (54) and are able to fold about the hinges (56) from a collapsed configuration, in which they are flat against the frame (54), to an extended configuration in which they extend away from the frame (54). The support panels (54) may be used as stands for supporting cooking utensils or the like.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A collapsible barbeque comprising a generally rectangular frame which carries a trough and a number of leg assemblies which support the frame above a surface, wherein the trough is generally rectangular in shape and includes a rigid floor to provide a heat support surface and two collapsible sidewalls which connect the floor to the frame, the sidewalls and the leg assemblies being hingedly attached to the frame, and wherein the sidewalls include at least one hinge up a height thereof to allow the sidewalls to collapse inwardly in concertina fashion with the floor moving towards the frame and the sidewalls folding inwardly toward each other such that the collapsible barbeque is movable from an open, operative configuration in which the collapsible sidewalls are extended and the leg assemblies are hinged outwardly from the frame to a closed, portable configuration in which the collapsible sidewalls are collapsed and the leg assemblies are folded flat against the frame.

2. The collapsible barbeque as claimed in claim 1, wherein each collapsible sidewall includes two or more hinges up the height thereof which split the sidewall into three or more sections.

3. The collapsible barbeque as claimed in claim 1, wherein the collapsible barbeque includes two leg assemblies hingedly attached on opposing ends of the frame and wherein each leg assembly provides an end wall for the trough.

4. The collapsible barbeque as claimed in claim 1, wherein the leg assemblies and collapsible sidewalls are hingedly attached to inner surfaces of the frame and the leg assemblies are arranged to hinge into the interior of the frame.

5. The collapsible barbeque as claimed in claim 1, wherein the collapsible barbeque includes at least one support panel hingedly attached to an outer surface of the frame and wherein the support panel is enabled to fold outwardly from the frame.

6. The collapsible barbeque as claimed in claim 1, wherein the collapsible barbeque includes a cooking grid that is configured to, in use, be supported on the frame when the barbeque is in the open, operative configuration, and to cover substantially the entire surface of the frame.

7. The collapsible barbeque as claimed in claim 6, wherein the collapsible barbeque includes a spacer configured to be supported on the frame with the cooking grid supported by the spacer so as to permit varying the space between the cooking grid and the frame to be varied.

8. The collapsible barbeque as claimed in claim 1, wherein the collapsible barbeque includes a number of elongate reinforcing members each being hingedly attached to a leg assembly and the frame, with the elongate reinforcing members each including a hinge substantially midway along its length which splits the reinforcing members into two elements so as to permit the reinforcing members to fold about the hinge when the collapsible barbeque is moved between the open, operative configuration to the closed, portable configuration.

9. The collapsible barbeque as claimed in claim 8, wherein the reinforcing members each include a detent adjacent the hinge so that the reinforcing members can fold in one direction only.

10. The collapsible barbeque as claimed in claim 1, wherein the collapsible barbeque is made from a fire-resistant material.

11. The collapsible barbeque as claimed in claim 10, wherein the collapsible barbeque is made from aluminium or stainless steel.

* * * * *